United States Patent
Morimoto et al.

(10) Patent No.: US 6,774,935 B1
(45) Date of Patent: Aug. 10, 2004

(54) DIGITAL CAMERA

(75) Inventors: Yasuhiro Morimoto, Takatsuki (JP); Hirokazu Naruto, Higashiosaka (JP)

(73) Assignee: Minolta Co., Ltd., Osaka (JP)

(*) Notice: Subject to any disclaimer, the term of this patent is extended or adjusted under 35 U.S.C. 154(b) by 0 days.

(21) Appl. No.: 09/426,586

(22) Filed: Oct. 25, 1999

(30) Foreign Application Priority Data

Oct. 26, 1998 (JP) ............................................. 10-304421

(51) Int. Cl.[7] ...................... H04N 5/232; H04N 5/222; G06F 13/00
(52) U.S. Cl. ................. 348/211.5; 348/211.3; 348/333.05; 710/110
(58) Field of Search ....................... 348/333.01, 333.12, 348/207.1, 207.11, 211.1, 211.11, 211.5, 333.05, 211.4, 211.3; 710/110

(56) References Cited

U.S. PATENT DOCUMENTS

| | | | | |
|---|---|---|---|---|
| 5,198,851 A | * | 3/1993 | Ogawa | 396/211 |
| 5,543,885 A | * | 8/1996 | Yamano et al. | 396/300 |
| 5,784,581 A | * | 7/1998 | Hannah | 710/110 |
| 5,790,878 A | * | 8/1998 | Anderson et al. | 713/340 |
| 5,982,429 A | * | 11/1999 | Kamamoto et al. | 348/333.06 |
| 5,991,842 A | * | 11/1999 | Takayama | 710/105 |
| 6,006,039 A | * | 12/1999 | Steinberg et al. | 396/57 |
| 6,104,886 A | * | 8/2000 | Suzuki et al. | 396/429 |
| 6,188,431 B1 | * | 2/2001 | Oie | 348/211.5 |
| 6,204,877 B1 | * | 3/2001 | Kiyokawa | 348/211.3 |
| 2001/0010543 A1 | * | 8/2001 | Ward et al. | 348/207 |
| 2001/0012071 A1 | * | 8/2001 | Oeda et al. | 348/333.01 |
| 2002/0041329 A1 | * | 4/2002 | Steinberg | 348/207 |

FOREIGN PATENT DOCUMENTS

JP 9-284696 10/1997

* cited by examiner

Primary Examiner—Tuan Ho
Assistant Examiner—Lin Ye
(74) Attorney, Agent, or Firm—McDermott, Will & Emery

(57) ABSTRACT

A digital camera includes a connector for connecting another digital camera and an interface for exchanging data between the digital camera and another digital camera. When another digital camera is connected to the connector, another digital camera is be controlled by a controller via the interface.

17 Claims, 18 Drawing Sheets ions have been made to a
digital camera equipped with a host interface for connecting
the digital camera to a personal computer in order to transfer
image data to the personal computer as a host computer so
as to process and/or store the image data.

Recently, new standards of interface such as a USB
(Universal Serial Bus) or an IEEE 1394 have been proposed,
and a digital camera utilizing the aforementioned interface
as a host interface has been provided.

Although these conventional interfaces are used to connect a host computer to its peripheral equipment such as a printer, it has not been considered that these conventional interfaces are used for connecting digital cameras for transferring image data therebetween.

Originally, in the USB standard, a tree structure in which a host computer is located at the summit thereof is constituted. Equipments included in the structure except for the computer located at the summit, are regarded as slave peripheral equipments which receive instructions from the summit computer. Therefore, in a digital camera connectable to a computer via a USB interface, like a digital camera equipped with a conventional RS-232C serial interface, it was impossible to control a peripheral equipment such as a printer connected to the interface from the digital camera.

SUMMARY OF THE INVENTION

Therefore, it is an object of the present invention to provide a convenient digital camera which can operate another digital camera connected to the digital camera without relying on a host computer.

It is another object of the present invention to provide a convenient digital camera which can operate a peripheral equipment such as a modem or a printer connected to the digital camera without relying on a host computer.

According to one aspect of the present invention, a digital camera includes a connector for connecting the digital camera to another digital camera, an interface for exchanging data between the digital camera and another digital camera, and a controller for controlling another digital camera via the interface when another digital camera is connected to the connector.

According to the aforementioned digital camera, an operation such as a data transfer between the digital camera and another digital camera can be performed easily at the digital camera side without relying on a software of a host computer, and the operation of another digital camera can be controlled by the digital camera.

According to another aspect of the present invention, a digital camera includes an interface based on a USB (Universal Serial Bus) standard, first and second connecters for connecting a plurality of external equipments via the interface, a detector for detecting whether or not the external equipment is connected to the first and second connector, and a controller for changing an operation of the external equipment connected to the second connector based on the detected result on whether or not the external equipment is connected to the first connector.

According to this digital camera, by utilizing a USB interface, which was only available for connecting the digital camera to a host computer, the digital camera can directly control a peripheral equipment such as a modem and/or a printer.

BRIEF DESCRIPTION OF THE DRAWINGS

The above and other objects, features, and advantages of the present invention will be apparent from the following detailed description of the preferred embodiments with reference to the attached drawings, wherein.

DETAILED DESCRIPTION OF THE PREFERRED EMBODIMENTS

Figure 1:
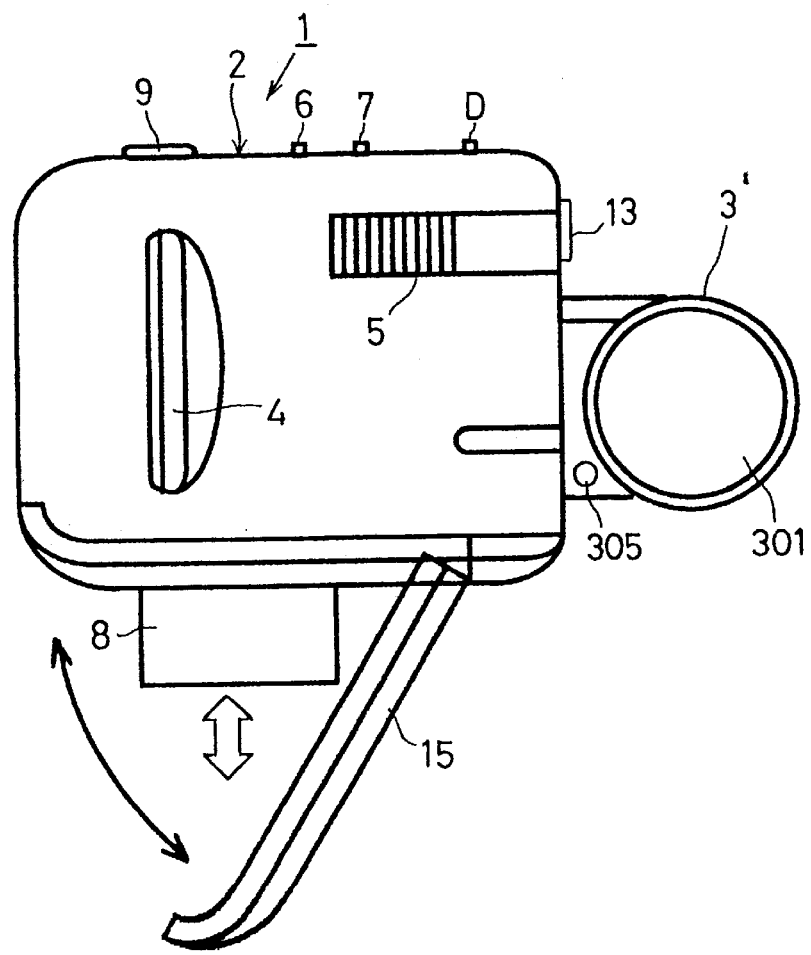
FIG. 1 is a front view of the digital camera according to an embodiment of the present invention.
Figure 2:
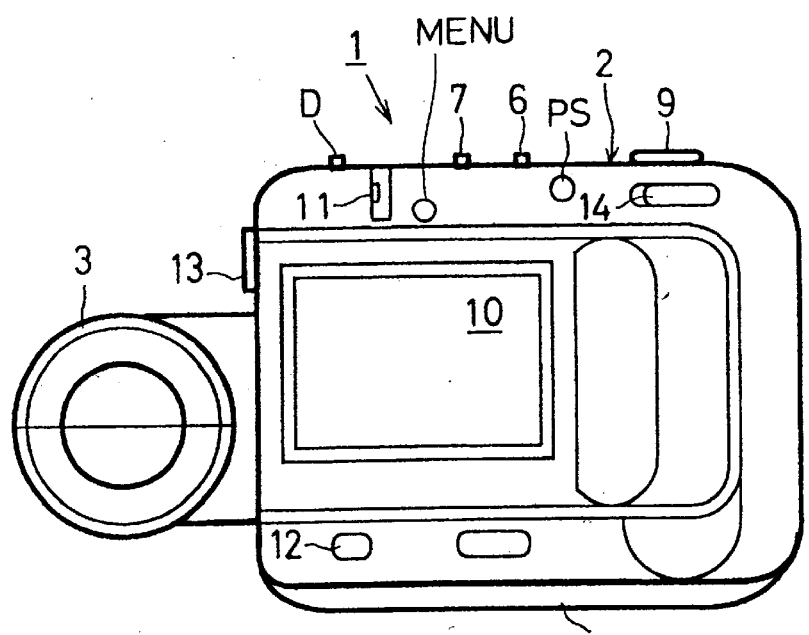
FIG. 2 is a rear view of the digital camera shown in FIG. 1.
Figure 3:
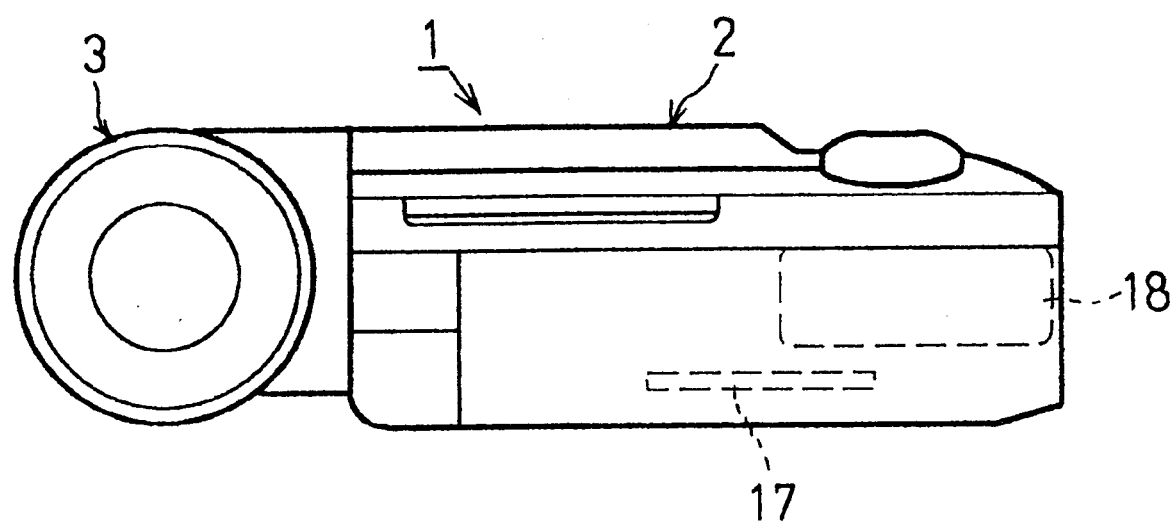
FIG. 3 is a bottom view of the digital camera shown in FIG. 1.

FIGS. 1 to 3 illustrate a digital camera according to one embodiment of this present invention.

As shown in FIGS. 1 to 3, the digital camera 1 comprises a camera frame, which is referred to as a main body 2, and a photographing unit 3 which is attachable to and removable from the main body 2 on the right side of the main body 2 in the front view shown in FIG. 1. The photographing unit 3 is rotatable within a plane parallel to the right side of the main body 2.

The photographing unit 3 has a photographing device comprising a macrozoom lens 301 and a photoelectric conversion device such as a CCD (Charge Coupled Device) array, to convert the optical image of an object into an electric image consisting of charge signals, each of which was generated by each pixel of the CCD via photoelectric conversion. The main body 2 has a display or LCD (Liquid Crystal Display) 10, a slot 17 for receiving a memory card 8, and a connection terminal 13 for connecting the digital camera 1 to a personal computer, another digital camera, a modem, a printer or the like. The image signal taken by the photographing unit 3 is subjected to a prescribed image processing in the main body 2. The processed image is displayed on the LCD display 10, recorded in the memory card 8 or transferred to the personal computer, another digital camera, or the like. The connection terminal 13 is comprised of two terminals which will be explained later.

A macrozoom lens 301 is provided in the photographing unit 3. An image pick-up circuit including a CCD color area sensor 303 is located at an appropriate position behind the macrozoom lens 301. A light adjusting circuit 304 having a light adjusting sensor 305 for receiving flash light reflected from the object is provided at an appropriate position in the photographing unit 3.

As shown in FIG. 1, a grip 4 is formed in the left-hand side of the front face of the camera main body 2, and a built-in flash lamp 5 is provided in the right-hand upper side at an appropriate position. Frame forwarding and backwarding switches 6 and 7 are provided near the center of the top face of the main body 2 as shown in FIG. 1. The forwarding switch 6 feeds the frame in the direction that the frame number increases in the photographed order, and is referred to as an UP key 6. The backwarding switch 7 feeds the frame in the direction that the frame number decreases, and is referred to as a DOWN key 7. A delete key D for deleting the images recorded in the memory card 8 is provided on the left side of the DOWN key 7, and a shutter button 9 is provided on the right side of the UP key 6 in the rear view shown in FIG. 2.

As shown in FIG. 2, an LCD 10 is provided in the middle of the left-hand side of the rear face of the camera main body 2. The LCD 10 functions as a view finder during photographing, and as a display during the reproduction of the recorded image.

Provided at the lower side of the LCD 10 is a compression rate setting switch 12 for switching the compression rate K of the image data to be recorded in the memory card 8. The compression rate setting switch 12 is a slide switch, for example. The connection terminal 13 is provided on the side face of the main body 2 near the photographing unit 3. A power switch PS and a operation menu call switch MENU (also referred to as a "menu call key") are provided on the top of the rear face of the main body 2.

The flash lamp (which may be abbreviated as "FL") of the digital camera 1 has an "automatic flash mode", a "forcible flash mode", and a "flash prohibition model". In the "automatic flash mode", the built-in flash lamp 5 is automatically flashed according to the luminance of the object. In the "forcible flash mode", the built-in flash lamp 5 is forcibly flashed regardless of the luminance of the object. In the "flash prohibition mode", light emission of the built-in flash lamp 5 is prohibited. Every time the user presses the FL mode setting key 11 positioned above the LCD 10 on the rear face of the main body 2, the flash mode is switched among three modes in a cyclic order. The digital camera 1 has a ⅛ compression rate and a ¹⁄₂₀ compression rate, and the user can select the preferred compression rate K. For example, if the compression rate setting switch 12 is shifted to the right, the compression rate K is set to ⅛, and if it is shifted to the left, the compression rate K is set to ¹⁄₂₀. Although, in this embodiment, the compression rate K is set two modes, it may be set to three or more values.

A photographing/reproduction mode setting switch 14 is positioned at the top right of the rear face of the main body 2. Digital pictures are taken in the photographing mode. In the reproduction mode, the digital images recorded in the memory card 8 are reproduced and displayed on the LCD 10. The photographing/reproduction mode setting switch 14 is also a bicontact slide switch. For example, if the switch is shifted to the right, the reproduction mode is selected, and if shifted to the left, the photographing mode is selected.

A battery cavity 18 and a slot 17 for receiving a memory card 8 are provided on the bottom face of the main body 2. The battery cavity 18 and the slot 17 are covered with a clam-shell type cover 15. The digital camera 1 according to the embodiment has a power supply source consisting of four AA batteries connected in series.

Figure 4:
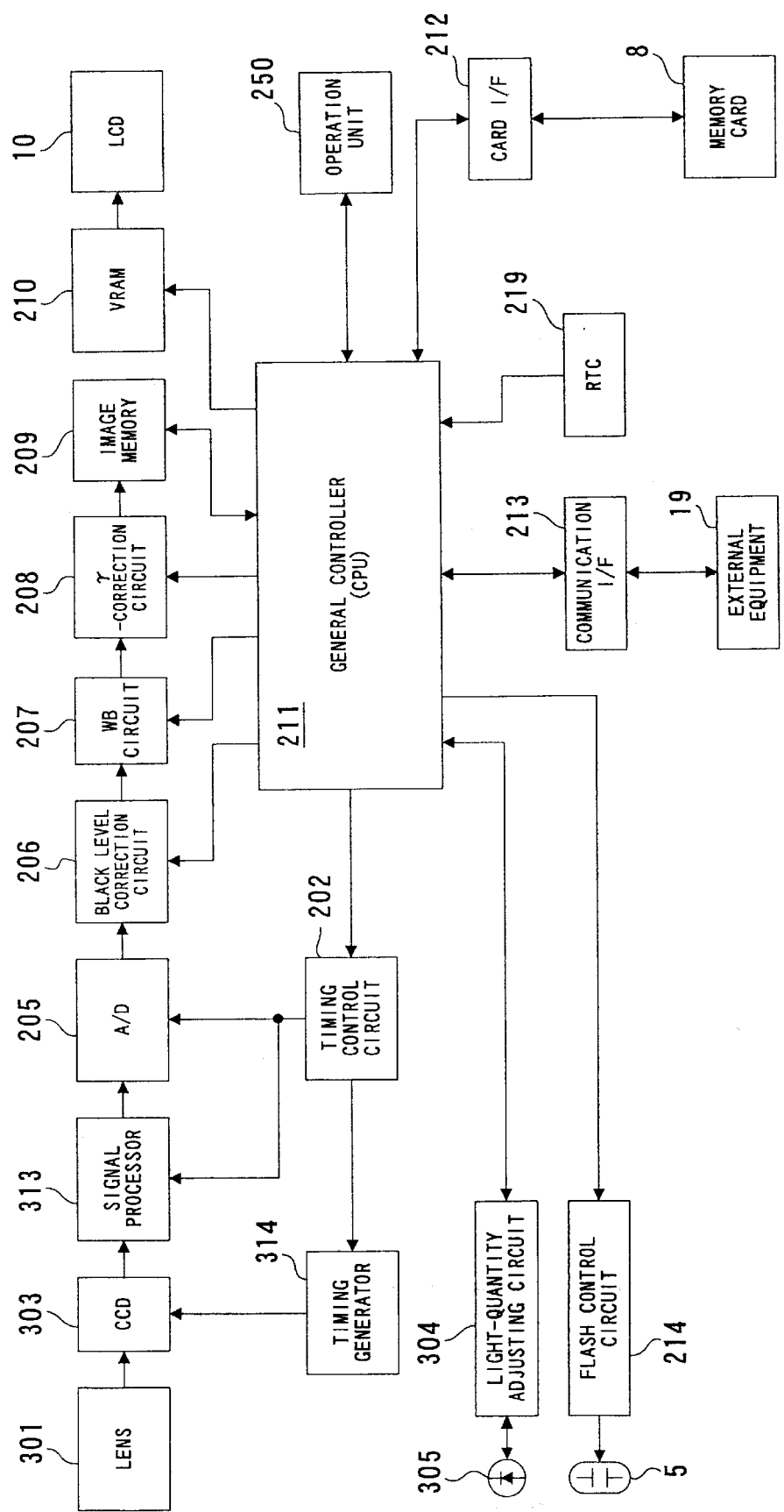
FIG. 4 is a block diagram showing the control system of the digital camera shown in FIG. 1.

FIG. 4 is a block diagram of the control system of the digital camera 1.

The CCD 303 in the photographing unit 3 photoelectrically converts the optical image of the object focused by the macrozoom lens 301 into image signals of three color components R (red), G (green) and B (blue), and outputs the image signals to the signal processor 313. This image signal consists of sequence of pixel signals received by the respective pixels. A timing generator 314 generates various timing pulses for controlling and driving the CCD 303.

Since the diaphragm of the photographing unit 3 is fixed, the exposure of the photographing unit 3 is controlled by adjusting the quantity of exposure of the CCD 303, that is, the charge accumulation time of the CCD 303, which corresponds to the shutter speed. If the luminance of the object is too low to select to an appropriate shutter speed, the level of the image signal output from the CCD 303 is adjusted in order to compensate for the insufficient exposure. In other words, at a low luminance, the exposure is controlled by adjusting both the shutter speed and the gain. The level of the image signal is adjusted by controlling the gain of the AGC circuit in the signal processor 313.

The timing generator 314 generates various driving control signals for the CCD 303 based on the reference clock supplied from the timing control circuit 202. The signals generated by the timing generator 314 includes a timing signal for starting and finishing integration (i.e., exposure), and clock signals (horizontal synchronization signals, vertical synchronization signals, transfer signals, etc.) for controlling the reading timing of the light-receiving signals from the respective pixels. These timing signals are supplied to the CCD 303.

The signal processor 313 applies prescribed analogue signal processing to the analog image signal output from the CCD 303. The signal processor 313 has a CDS (correlation double sampling) circuit for reducing the noise of the image signal and an AGC (automatic gain control) circuit for adjusting the level of the image signal by controlling the gain of this AGC circuit.

The light-quantity adjusting circuit 304 sets the light emission of the built-in flash lamp 5 to a predetermined level determined by the general controller 211 when the flash lamp is used during the photographing. During the flash photographing, the flash light reflected from the object is received by the light-adjusting sensor 305 upon starting exposure. When the quantity of light received by the sensor 305 reaches a predetermined level, the light-quantity adjusting circuit 304 supplies a flash stop signal to the flash control circuit 214 via the general controller 211. In response to the flash stop signal, the flash control circuit 214 forcibly stops the light emission of the built-in flash lamp 5, whereby the light emission amount of the built-in flash lamp 5 can be regulated to the prescribed level.

The A/D converter 205 provided in the main body 2 of the digital camera 1 converts each pixel signal (i.e., analog signal) of the image signal sequence into a 10-bit digital signal based on the A/D conversion clock supplied from the A/D clock generator (not shown).

A reference clock/timing generator 314 and a timing control circuit 202 are also provided in the main body 2. The timing control circuit 202 is controlled by the general controller 211.

A black level correction circuit 206 corrects the black level of the digitalized pixel signal (hereinafter referred to as pixel data) converted by the A/D converter 205 to the reference black level. A white balance circuit (hereinafter referred to as WB circuit) 207 converts the level of the pixel data of each color component of R, G or B, so that the white balance can be adjusted after γ (gamma) correction. The WB circuit 207 converts the level of the pixel data of each color component R, G, B using a level conversion table input from the general controller 211. The conversion coefficient (or the slope of the characteristic line) for each color component in the level conversion table is set each photographed image by the general controller 211.

The γ (gamma) correction circuit 208 corrects for the γ (gamma) characteristic of the pixel data. The γ (gamma) correction circuit 208 has, for example, six γ (gamma) correction tables with different γ (gamma) characteristics, and uses the most appropriate γ (gamma) correction table according to the photographed scene or the photographic conditions.

An image memory 209 stores the pixel data output from the γ (gamma) correction circuit 208. The memory capacity of the image memory 209 corresponds to one frame data. Accordingly, if the CCD 303 has an n×m pixel matrix, the image memory 209 has a memory capacity of n×m pixel data, and each pixel data is stored in the corresponding pixel position in the memory.

A VRAM 210 is a buffer memory for storing the image data which is to be reproduced and displayed on the LCD 10. The memory capacity of the VRAM 210 corresponds to the number of pixels of the LCD 10.

In the photographing preparation mode, each pixel data of the image taken by the photographing unit 3 every 1/30 seconds is subjected to the prescribed signal processing by the sequence from the A/D converter 205 to the γ (gamma) correction circuit 208, and stored in the image memory 209. This pixel data is simultaneously transferred to the VRAM 210 via the general controller 211, and displayed on the LCD 10. The user can recognize the photographed object on the LCD 10. In the reproduction mode, the image read out from the memory card 8 is subjected to the prescribed signal processing by the general controller 211, which is then transferred to the VRAM 210, and displayed on the LCD 10.

A card I/F 212 is an interface for writing the image data into the memory card 8 or reading the image data from the memory card 8. A communication I/F 213 is an interface based on the USB standard, or an interface for externally connecting an external equipment such as a personal computer or another digital camera.

A flash control circuit 214 controls light emission of the built-in flash lamp 5. In particular, the flash control circuit 214 controls the quantity of flash light, flash timing, and so on, based on the control signal supplied from the general controller 211. The flash control circuit 214 also brings the light emission to zero based on the flash stop signal STP input from the light-quantity adjusting circuit 304.

An RTC (Real Time Clock) 219 is a time circuit for keeping the track of the date and time of each photograph, which is driven by a separate power source (not shown).

An operation unit 250 has switches corresponding to the UP key 6, the DOWN key 7, the shutter button 7, the FL mode setting key 11, the compression rate setting key 12, the photographing/reproduction mode setting switch 14, and the operation menu call switch MENU.

The general controller 211 comprises a micro computer, and it organically controls the driving timing of each element in the photographing unit 3 and the main body 2 so as to generally control the photographing operation of the digital camera 1. In a case where the digital camera 1 is connected to an apparatus such as another digital camera, a printer, or a modem, the general controller 211 controls such apparatus. Furthermore, in a case where a host computer or a hub is connected to the digital camera at its upstream side, the general controller 211 functions as a hub for the downstream side apparatus.

In the photographing mode, if the shutter button 9 is pressed to start photographing, the general controller 211 creates a thumb nail image created from the image taken in the image memory 209 after the start of the photographing operation, and the compressed image created by a JPEG method at the compression rate K when the compression mode is selected by manipulating the compression rate setting slide switch 12. A tag information (such as the frame number, exposure value, shutter speed, compression rate K, photographing date and time, flash ON/OFF data, scene information, image type, judged result of the image, etc) stored in the memory card 8, the compressed image and the thumb nail image are stored in the memory card 8.

The memory card 8 can store forty frames of images taken by the digital camera 1 at a 1/20 compression rate. Each of the frames has tag information, high-resolution image data (640×480 pixels) compressed by a JPEG method, and thumb nail image data (80×60 pixels). Each frame may be treated as an image file of EXIF type.

As mentioned above, in this embodiment, the aforementioned communication I/F 213 is an interface based on a USB standard. The USB standard has been developed for a medium speed interface for connecting a peripheral apparatus of a personal computer, and has drawn attention to an interface available for a hot-connection by a Plug-And-Play.

Figure 5:
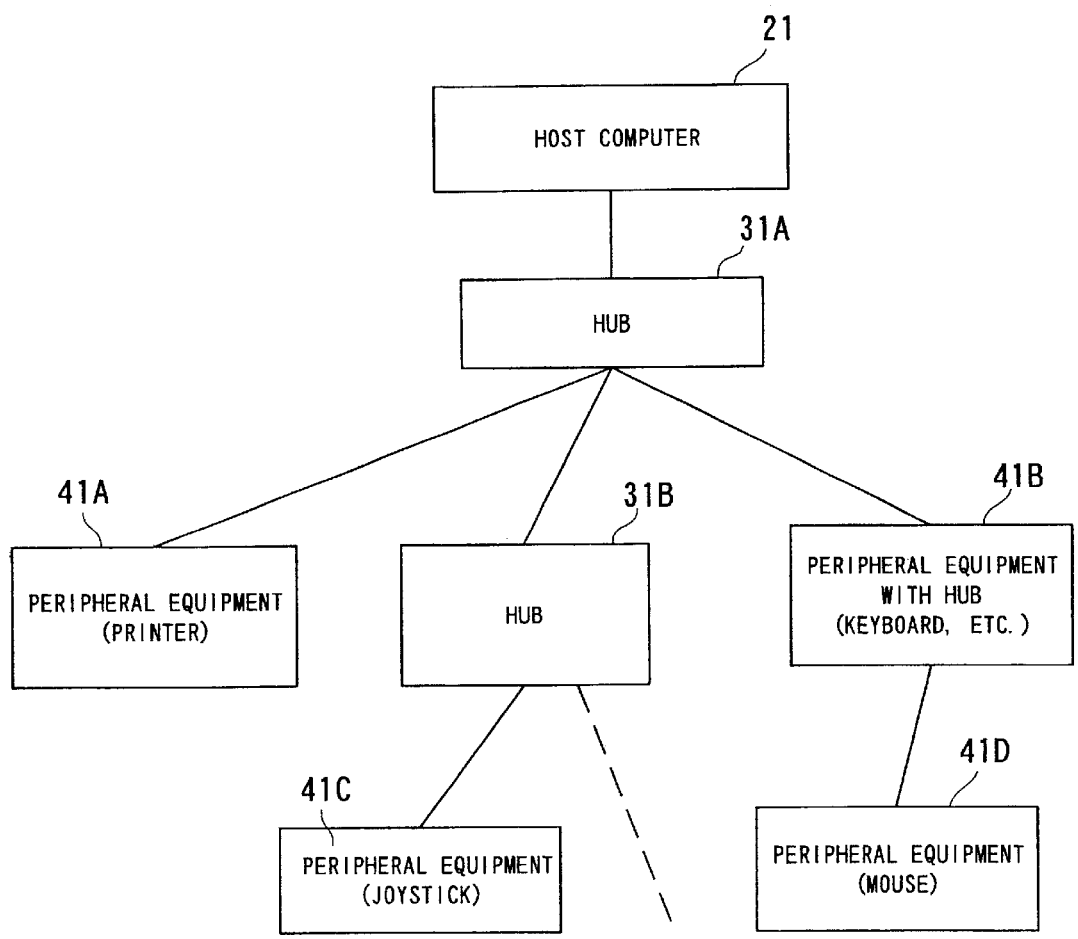
FIG. 5 is a block diagram showing a connection structure utilizing an interface based on a USB standard.
Figure 6:
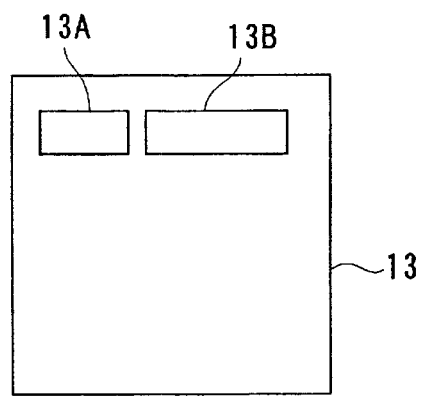
FIG. 6 is an explanatory view of a connector for connecting a host interface of a digital camera.

The USB standard has a connection structure as shown in FIG. 5, the personal computer 21 located at the summit of the tree-structure takes the initiative as a host, and controls a corresponding peripheral equipment such as a printer 41A, a key board 41B via an upstream hub 31A. Furthermore, the personal computer 21 controls a corresponding peripheral equipment such as a joy stick 41C via a downstream hub 31B, and also controls a peripheral equipment such as a mouse 41D via the aforementioned peripheral equipment 41B.

As it is understood from the above, in the USB interface, only the host computer 21 located at the summit of the tree-structure controls each of the peripheral equipments. For example, in the example shown in FIG. 5, it is impossible for the mouse 41D itself to directly control the printer 41A. The host computer 21 detects the operation of the mouse 41D, and controls the printer 41A depending on the detected results.

Conventionally, the digital camera 1 was treated as a peripheral equipment of the host computer 21, and was controlled by the host computer 21 depending on the instruction of the host computer 21 or the detected results.

However, in the USB interface, an equipment located at the summit of the tree-structure is not limited to the host computer 21. As mentioned above, since the general controller 211 of the digital camera 1 is equipped with a micro computer, the digital camera 1 can act as a host computer if a driver software for the USB interface is installed in the micro computer.

In this embodiment, the digital camera 1 can act as a host computer along the USB interface standard (master camera mode), and also can act as a peripheral equipment (slave camera mode) by the switch operation which will be mentioned later.

In the digital camera 1 according to this embodiment, the connection terminal 13 having the upstream connector 13A and the downstream connector 13B is connected to the communication I/F 213. The upstream connector 13A is used for connecting the host computer 21 or a hub 31A, and the downstream connector 13B is used for connecting another digital camera or other peripheral equipments 41. In this embodiment, a personal computer is used as a host computer.

Figure 8:
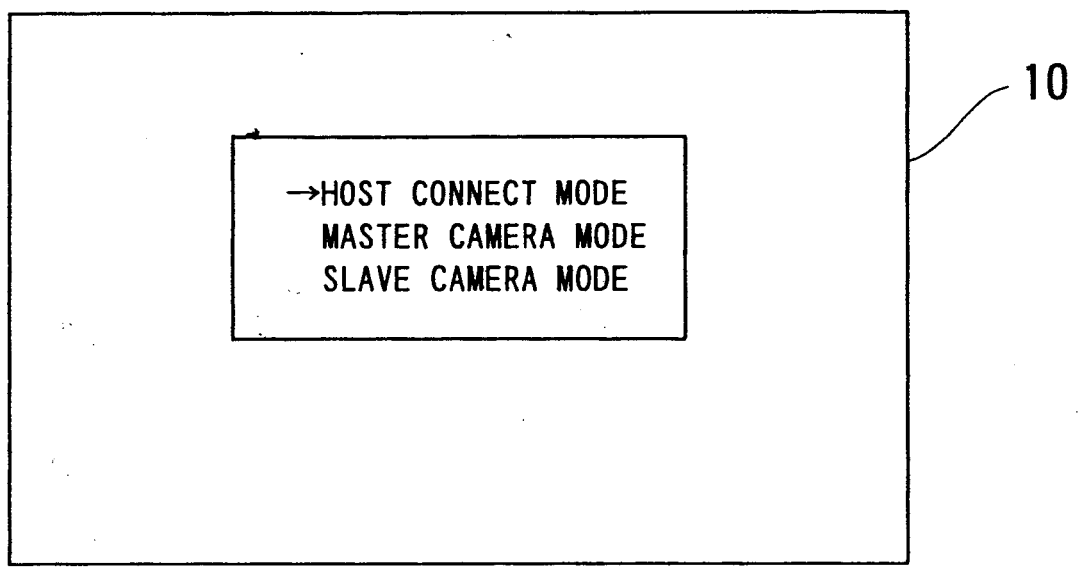
FIG. 8 illustrates a screen showing a connection mode select menu when a menu call key is operated.

In the digital camera 1 according to this embodiment, in a state that a host computer or another digital camera is connected to the connection terminal 13 of the camera main body 2, it is possible to call a camera function by pressing the menu call key MENU, and is also possible to set the camera function depending on the called menu. When the menu call key MENU is pressed, as shown in FIG. 8, the connection mode select menu is displayed on the LCD display 10. The menu can be selected by shifting the arrow by using the UP switch 6 and the DOWN switch 7. After the selection of the menu, when the shutter button 9 is depressed, the selected function is set.

Figure 7:
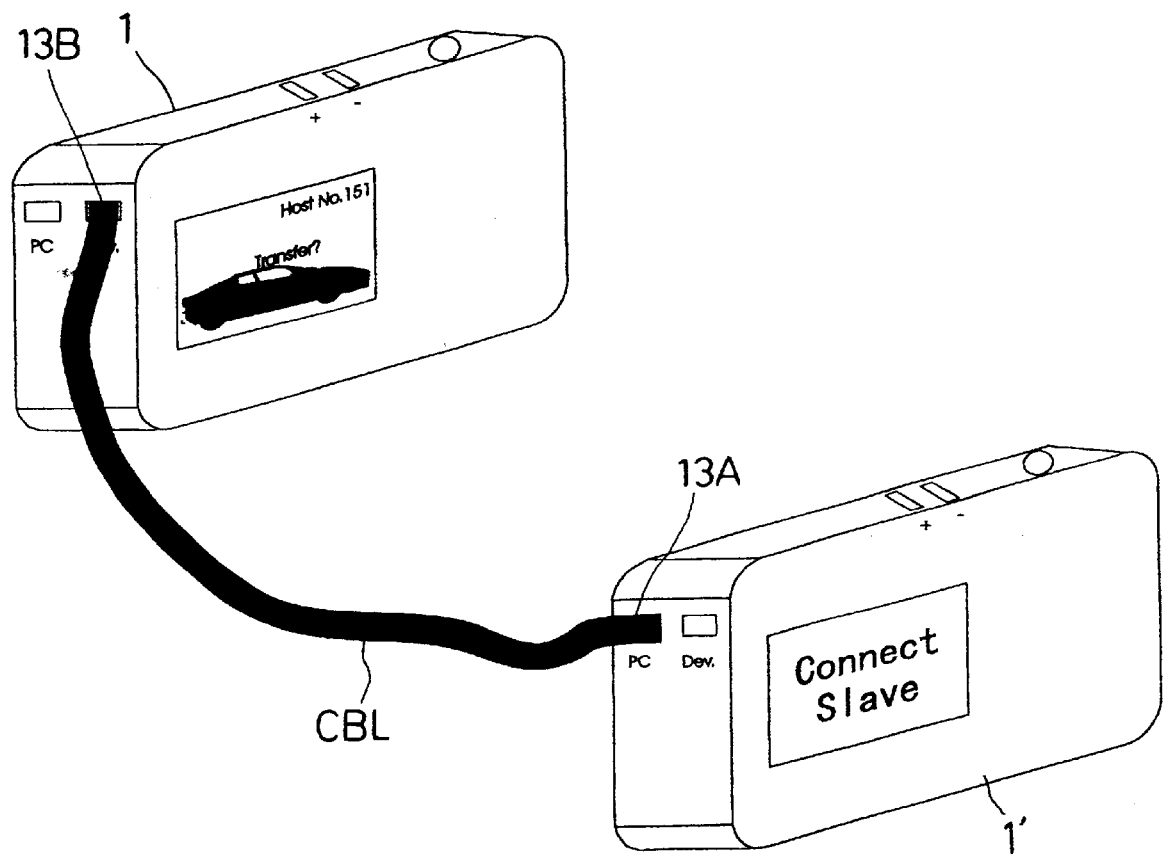
FIG. 7 is a perspective view showing the digital camera connected to another digital camera via a cable.

Following is an explanation of the operation of the digital cameras in a case where the digital camera 1 and another digital camera 1' are connected each other via a cable CBL as shown in FIG. 7.

First, the downstream connector 13B of the digital camera 1 and the upstream connector 13A of another digital camera 1' are connected each other via a cable CBL, and both the digital cameras 1 and 1' are activated by depressing the respective power switch PS.

Thereafter, in each digital camera 1 and 1', the menu call key MENU is depressed to call the connection mode select menu shown in FIG. 8, and one of the digital camera 1 is set to be a master camera mode, and the other is set to be a slave camera mode. In this specification, the digital camera 1 set to be a master camera mode is referred to as a master camera (i.e., a camera which controls the other camera) and the digital camera 1' set to be a slave camera mode is referred to as a slave camera (i.e., a camera which is controlled by the other camera).

After the completion of the setting of both of the cameras 1 and 1', all switch operation of the slave camera 1' except for the menu call key MENU and the power switch PS becomes invalid, and all switch operations will be dominated by the master camera.

Figure 9:
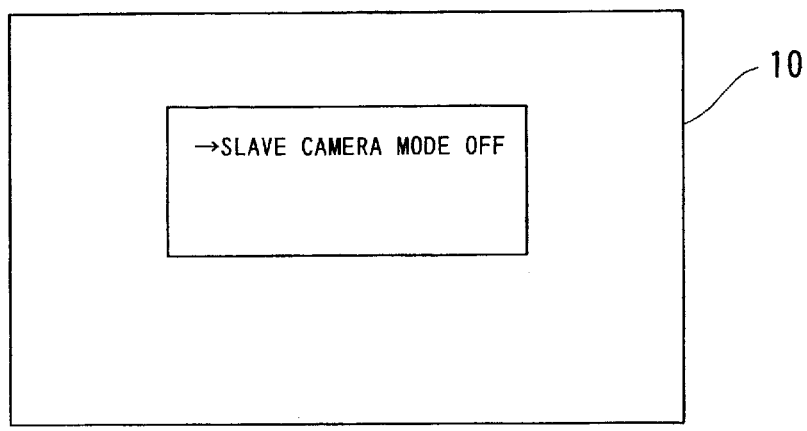
FIG. 9 illustrates a screen showing a slave camera menu.

When the menu call key MENU of the slave camera 1' is depressed, a menu shown in FIG. 9 is displayed. In this state, when the shutter button 9 is depressed, the slave mode is released (OFF).

Figure 10:
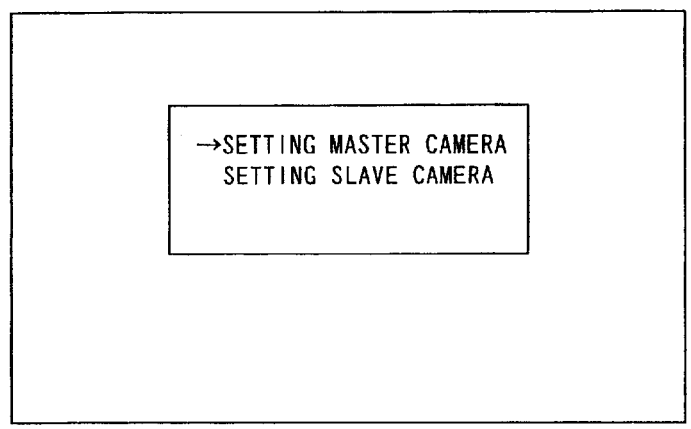
FIG. 10 illustrates a screen showing a master camera menu.

On the other hand, when the menu call key MENU of the master camera 1 is depressed, as shown in FIG. 10, a master camera menu is displayed. In this state, the camera setting of the connected cameras can be changed.

According to the communication system in which these digital cameras 1 and 1' are used, an operation such as a data transfer between the two digital cameras can easily be performed by a single digital camera 1 without using an application software of a host computer or a peripheral equipment. Furthermore, the use can control the operation of the other digital camera, which results in a simple operation.

Figure 11:
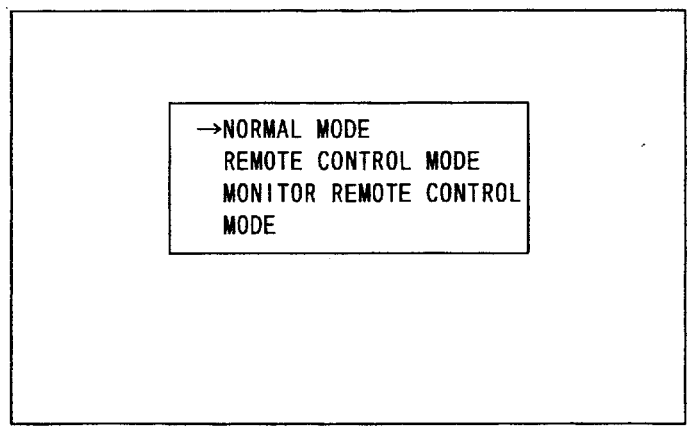
FIG. 11 illustrates a screen showing a master camera mode set menu.

In a master camera menu shown in FIG. 10, after the selection of the "master camera setting" by using the UP switch 6 or the DOWN switch 7, when the shutter button 9 is depressed, the mode set menu of the master camera is displayed as shown in FIG. 11.

In this menu, the following three modes are available.

(1) Normal Mode:

In this mode, the camera functions as a normal master camera, and the results of the switch operation of the master camera are shown on the LCD display 10 of this master camera.

(2) Remote Control Mode:

In this mode, the master camera 1 is used as a remote controller of the slave camera 1'. Each of the key operations of the master camera 1 corresponds to the corresponding key operation of the slave camera 1' except for the menu call key MENU.

Figure 13:
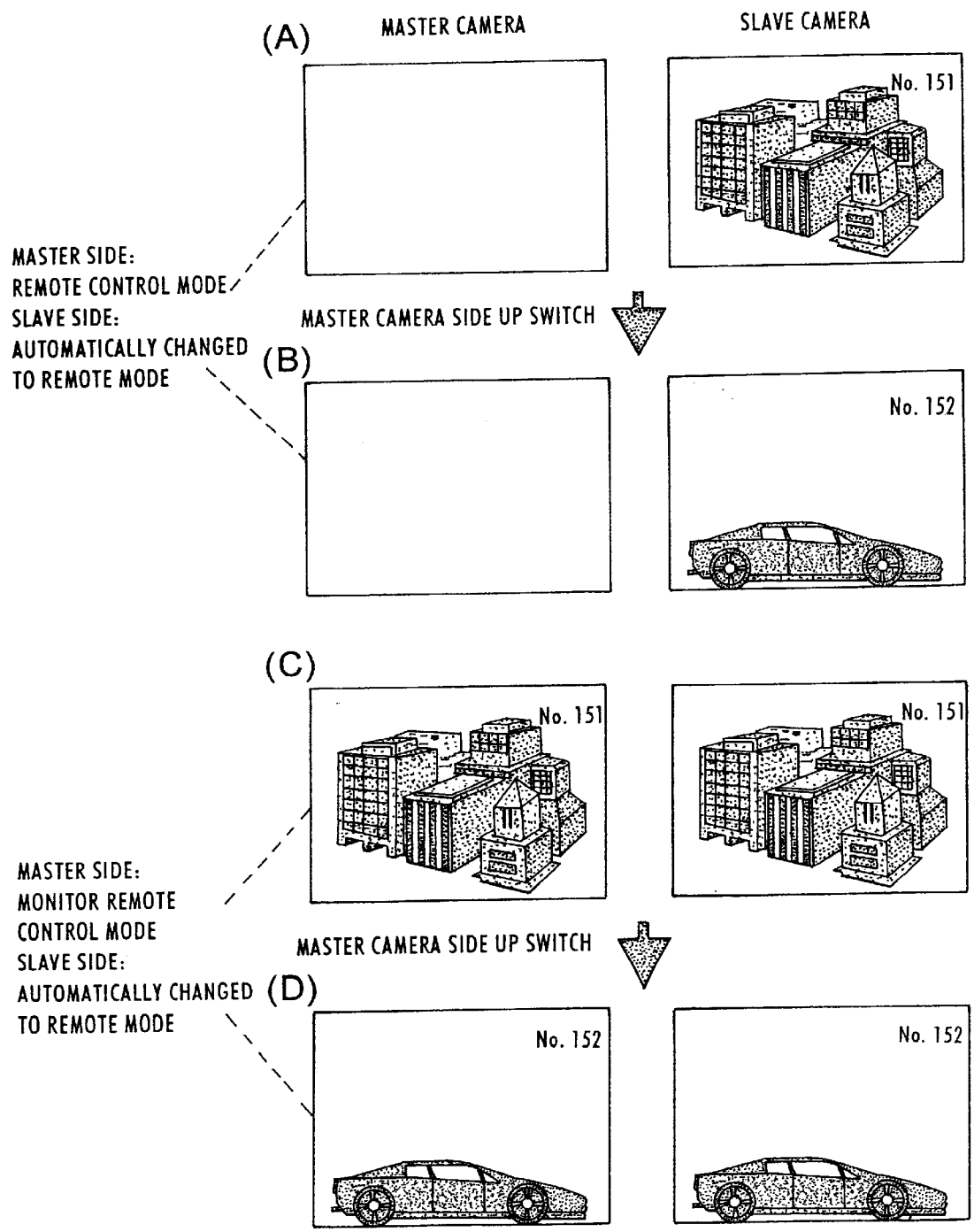
FIG. 13 illustrates a screen showing a data transferring state with comparing the master camera and the slave camera as one example of a remote control mode of the master camera.

For example, as shown in FIGS. 13A and 13B, when the UP switch 6 of the master camera 1 is depressed, the images of both cameras are forwarded as if the UP switch of the slave camera 1' were depressed. In this mode, the LCD display 10 of the master camera 1 is turned off (OFF). When the menu call key MENU is depressed, the master camera menu as shown in FIG. 10 is displayed.

(3) Monitor Remote Control Mode:

Similar to the aforementioned remote control mode, in this mode, the master camera 1 is used as a remote controller of the slave camera 1'. For example, as shown in FIGS. 13C and 13D, when the UP switch 6 of the master camera 1 is depressed, the images of both cameras are forwarded as if the UP switch of the slave camera 1' were depressed. However, in this mode, the LCD display 10 of the master camera 1 displays the same image as that displayed on the LCD display of the slave camera 1'.

Figure 12:
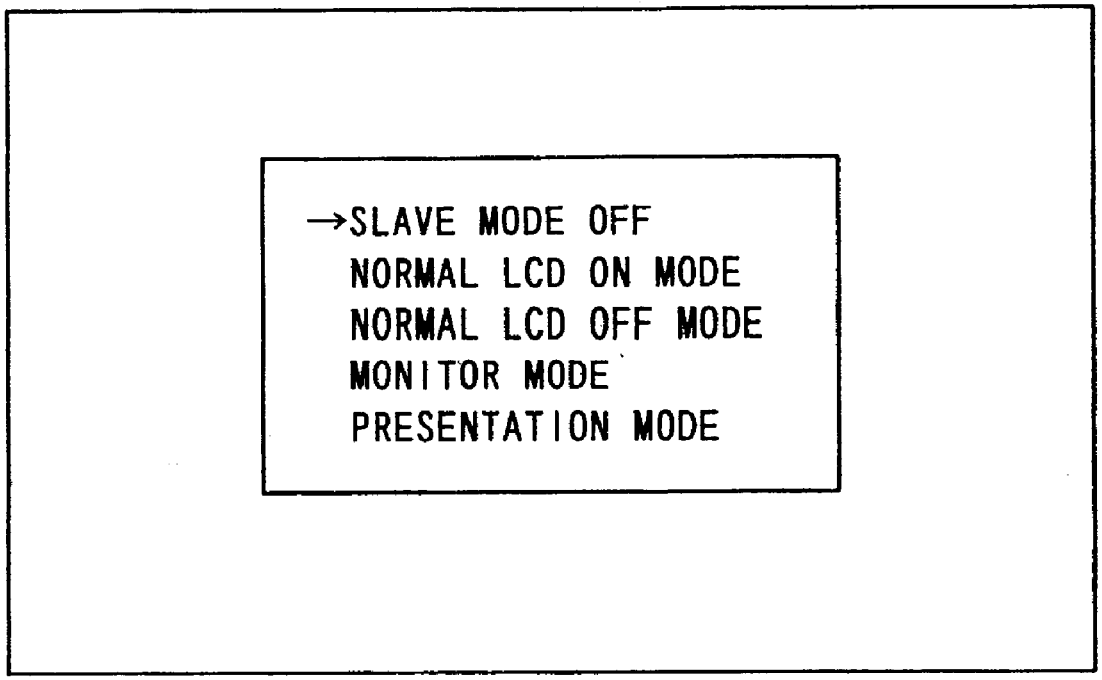
FIG. 12 illustrates a screen showing a slave camera mode set menu.

In the master camera menu shown in FIG. 10, after the selection of the "slave camera setting" by using the UP switch 6 or the DOWN switch 7, when the shutter button 9 is depressed, the "mode set menu" of the slave camera shown in FIG. 12 is displayed.

In this menu, the use can select one of the five modes of the slave camera 1' from the master camera 1 side.

(1) Slave mode OFF

In this mode, the slave mode of the current slave camera 1' is released so that the slave camera can be used as a normal camera. The selection of this mode can be made regardless of the set mode (Normal mode, Remote Control Mode, or Monitor Remote Control Mode) of the master camera 1.

(2) Normal LCD ON Mode:

This mode is a normal slave mode, and is mainly used for exchanging the images between the digital cameras.

Figure 14:
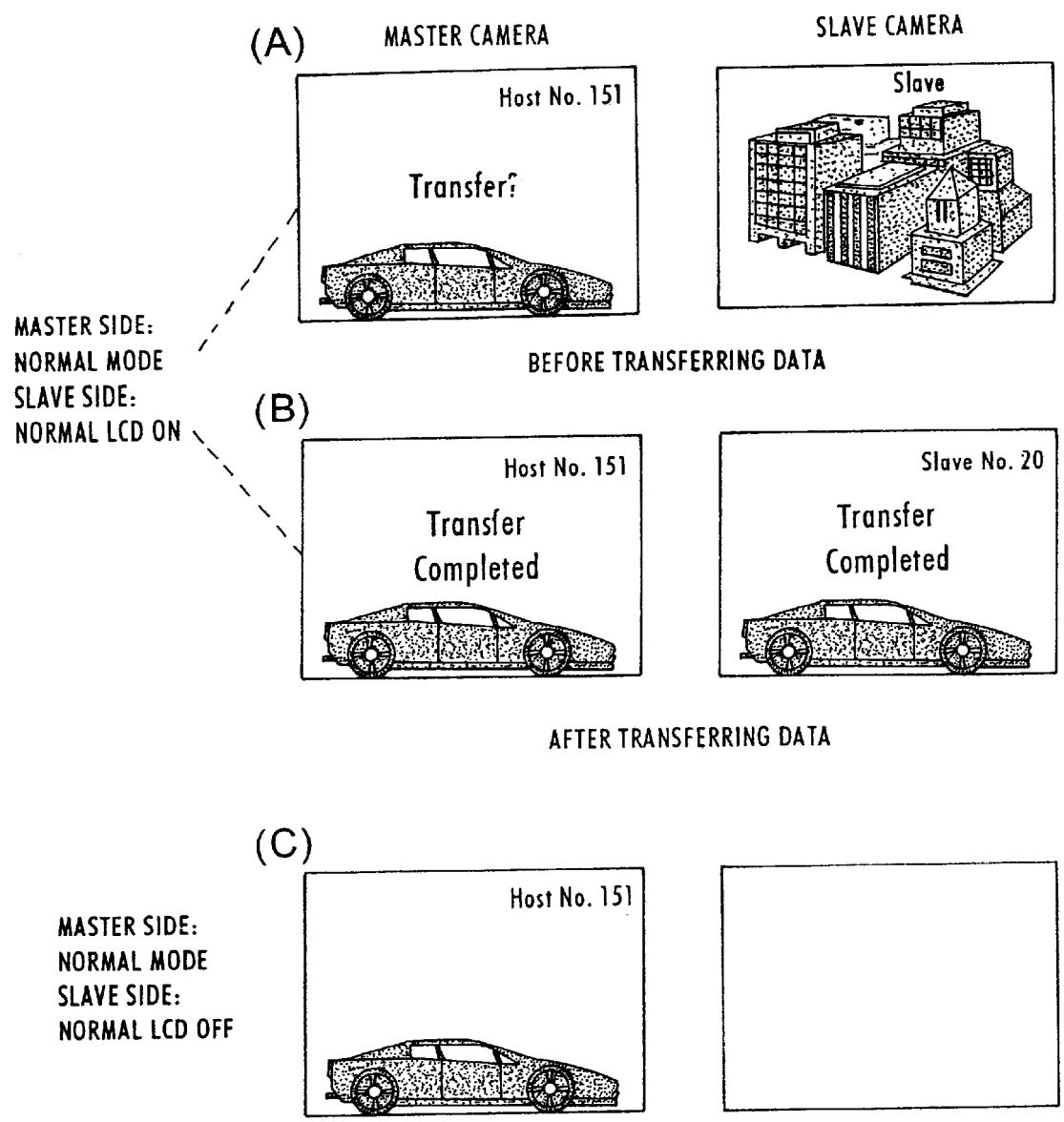
FIG. 14 illustrates a screen showing a data transferring state with comparing the master camera and the slave camera as one example of a normal mode of the master camera.

For example, in a case where an image is transferred between the master camera 1 and the slave camera 1', as shown in FIGS. 14A and 14B, the image transferred from the master camera 1 is displayed on the display of the slave camera 1' after the completion of transfer. If the master camera 1 is in a remote control mode or in a monitor remote control mode, the user cannot select this menu.

(3) Normal LCD OFF mode:

This mode is a normal slave mode, and is mainly used for exchanging the images between the digital cameras.

The difference between this mode and the aforementioned normal LCD ON mode is that the LCD display 10 of the slave camera is turned off. Thus, the transferred image is not displayed. If the master camera 1 is in a remote control mode or in a monitor remote control mode, the user cannot select this menu.

Figure 15:
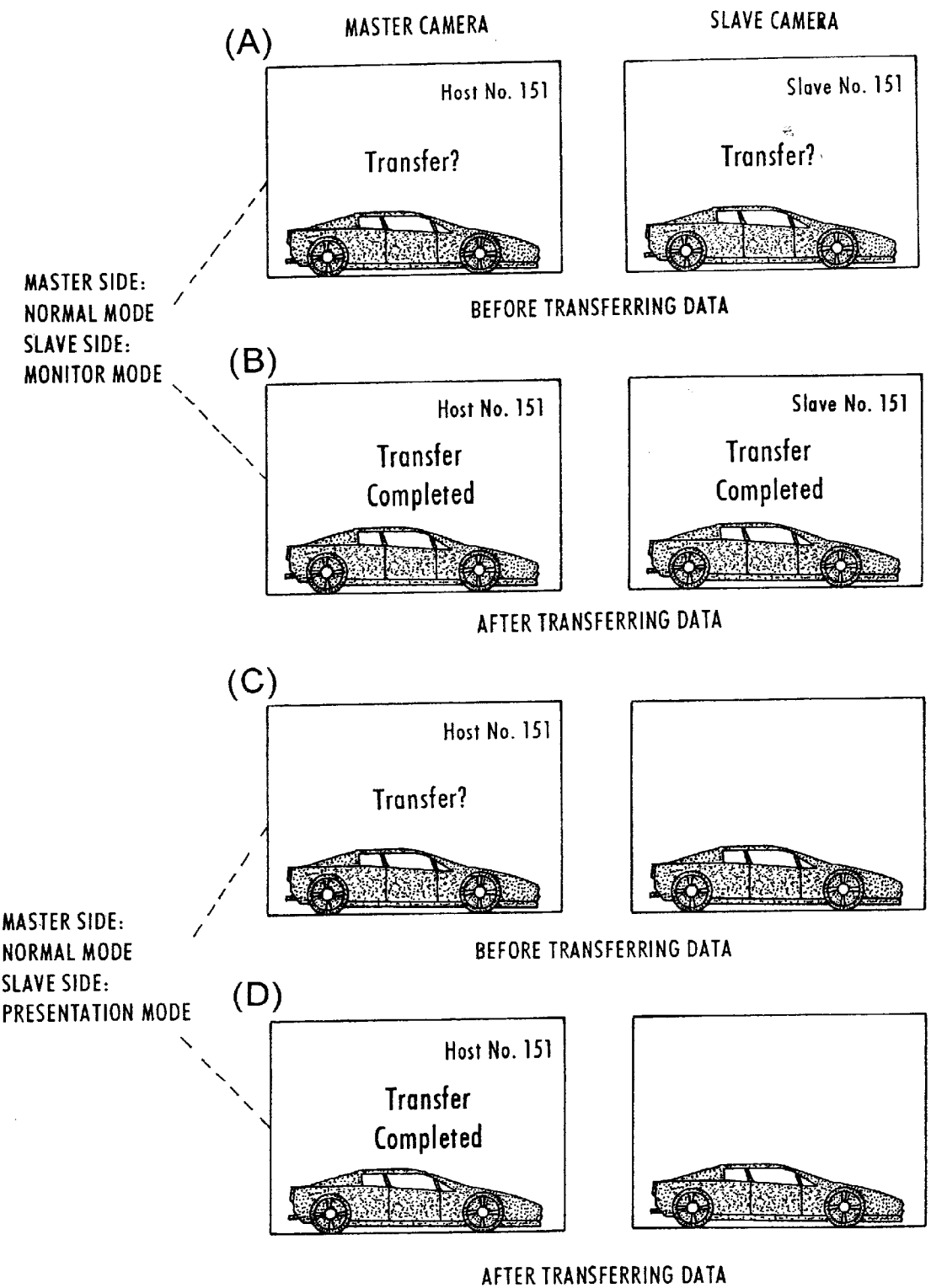
FIG. 15 illustrates a screen showing a data transferring state with comparing the master camera and the slave camera as another example of a normal mode of the master camera.

(4) Monitor Mode:

In this monitor mode, as shown in FIGS. 15A and 15B, the slave camera 1' acts as a monitor apparatus for displaying the same screen as that of the master camera 1. If the master camera 1 is in a remote control mode or in a monitor remote control mode, the user cannot select this menu.

(5) Presentation Mode:

This mode is almost the same mode as in the aforementioned monitor mode. In this mode, the salve camera 1' acts as a monitor apparatus of the master camera 1. However, unlike in the monitor mode, as shown in FIGS. 15C and 15D, only the image data is displayed on the LCD display 10 of the slave camera 1'. If the master camera 1 is in a remote control mode or in a monitor remote control mode, the user cannot select this menu.

Next, the method for transferring the image will be explained.

The image will be transferred from the master camera 1 to the slave camera 1'. After the selection of the image to be transferred by operating the UP switch 6 and the DOWN switch 7 of the master camera 1, when the shutter button 9 is depressed, the selected image will be transferred to the slave camera 1'. In this case, if the LCD display 10 of the slave camera 1' is turned on, the transferred image is displayed on the LCD display 10 of the slave camera 1' after the completion of the transfer.

Figure 16:
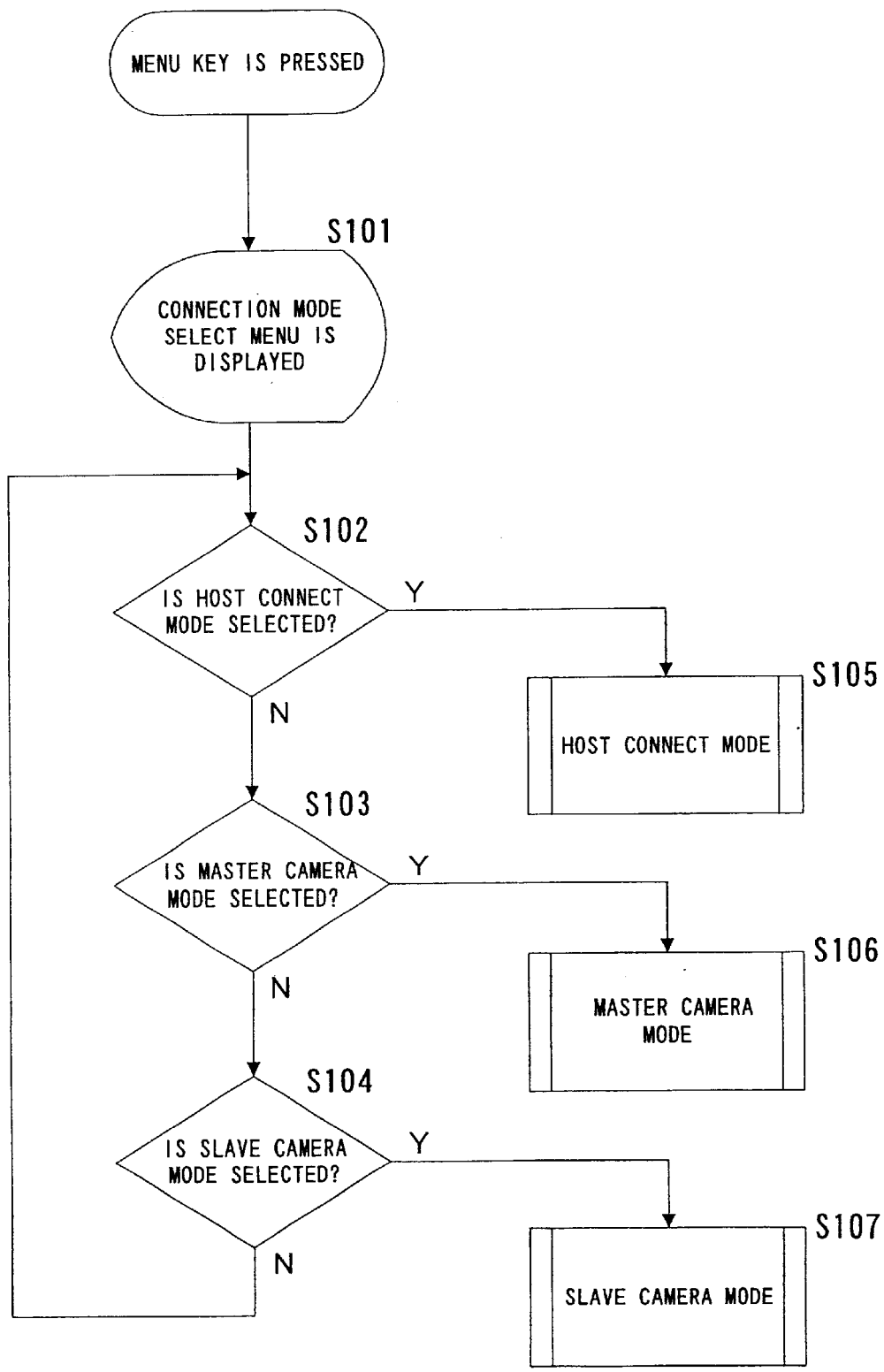
FIG. 16 is a flow chart showing a process for setting the digital camera function by a menu.

Next, the steps for setting the camera function by operating the menu call switch MENU will be explained with reference to the flow chart shown in FIG. 16.

In the following explanation, "Step", "YES" and "No" will be referred to as "S", "Y" and "N", respectively.

When MENU key is depressed, the connection mode select menu shown in FIG. 8 is displayed in S101, and it is judged if the "host connect mode" is selected in S102. If the "host connect mode" is selected (Y in S102), the "host connect mode" is set (S105).

If the "host connect mode" is not selected (N in S102), it is judged whether or not the "master camera mode" is selected in S103. If the "master camera mode" is selected (Y in S103), the "master camera mode" is set (S106).

If the "master camera mode" is not selected (N in S103), it is judged whether or not the "slave camera mode" is selected in S104. If the "slave camera mode" is selected (Y in S104), the "slave camera mode" is set (S107). If the "slave camera mode" is not selected (N in S104), the routine returns to S102.

Figure 17A:
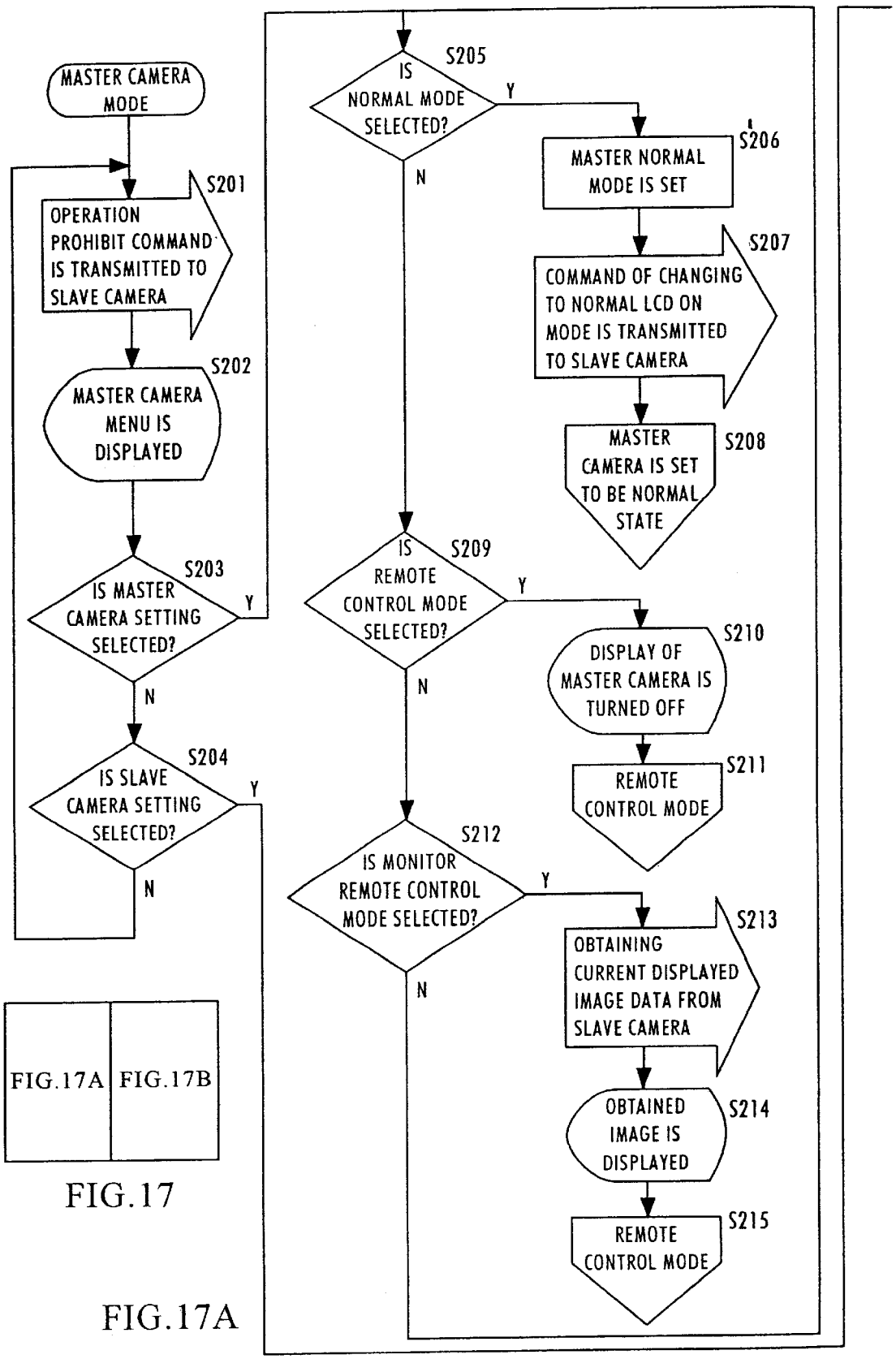
FIG. 17 is a flow chart showing a process of the master camera mode shown in FIG. 16.
Figure 17B:
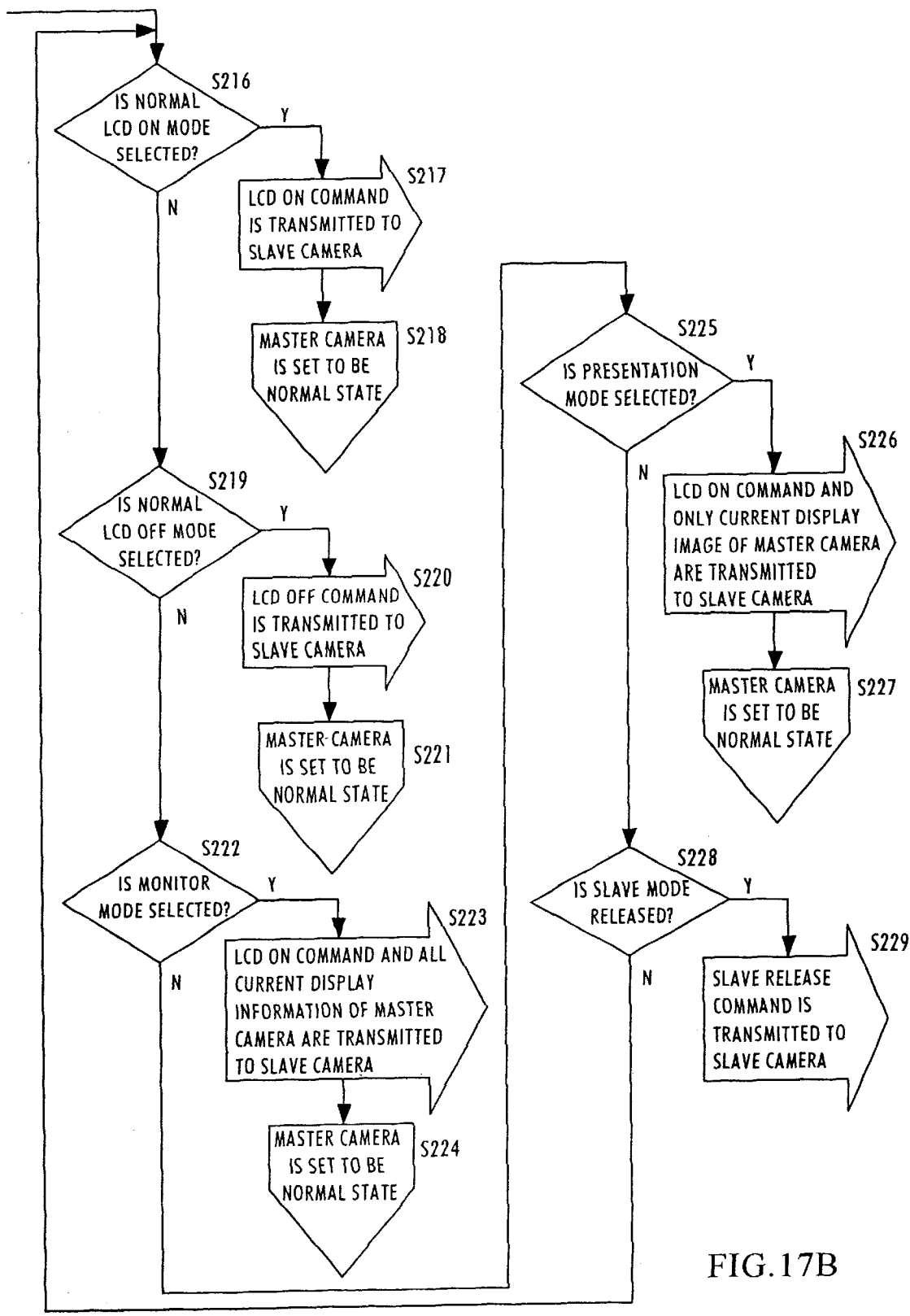

Next, the process in the "master camera mode" will be explained with reference to the flow chart shown in FIG. 17.

First, in S201, the operation prohibit command is transmitted to the slave camera 1', and the master camera menu shown in FIG. 10 is displayed on the LCD display of the master camera 1 in S202. In S203, it is judged whether or not the "master camera setting" is selected. If the "master camera setting" is selected (Y in S203), it is judged whether or not the "normal mode" is selected in S205. If the "master camera setting" is not selected (N in S203), it is judged whether or not the "slave camera setting" is selected in S204. If the "slave camera setting" is not selected (N in S204), the routine returns to S201.

In a case where the "master camera setting" is selected, if the "normal mode" is selected (Y in S205), the camera is set to be a master normal mode in S206, and the command for transferring to the normal LCD ON mode is transmitted to the slave camera 1' (S207). Thus, the master camera is set to be a normal mode state (S208).

If the aforementioned "normal mode" is not selected (N in S205), it is judged whether or not the "remote control mode" is selected in S209. If the "remote control mode" is selected (Y in S209), the display of the master camera is turned off (S210) and the routine proceeds to the remote control mode (S211).

If the "remote control mode" is not selected (N in S209), it is judged whether or not the "monitor remote control mode" is selected in S212. If the "monitor remote control mode" is selected (Y in S212), the current displayed image data is obtained from the slave camera 1' (S213), and the obtained image data is displayed on the LCD display 10 (S214). Then, the routine proceeds to the remote control mode (S215).

If the "monitor remote control mode" is not selected (N in S212), the routine returns to S205.

In S204, if the "slave camera setting" is selected (Y in S204), it is judged whether or not the "normal LCD ON mode" is selected in S216. If the "normal LCD ON mode" is selected (Y in S216), the LCD ON command is transmitted to the slave camera 1' in S217. Then, the master camera is set to be a normal mode state (S218).

If the "normal LCD ON mode" is not selected (N in S216), it is judged whether or not the "normal LCD OFF mode" is selected in S219. If selected (Y in S219), the LCD OFF command is transmitted to the slave camera 1' in S220. Then, the master camera is set to be a normal mode state (S221).

If the "normal LCD OFF mode" is not selected (N in S219), it is judged whether or not the "monitor mode" is selected in S222. If the "monitor mode" is selected (Y in S222), the LCD ON command and all current display information of the master camera 1 are transmitted to the slave camera 1' (S223). Then, the master camera is set to be a normal mode state (S224).

If the "monitor mode" is not selected (N in S222), it is judged whether or not the "presentation mode" is selected in S225. If the "presentation mode" is selected (Y in S225), the LCD ON command and only the current display image of the master camera 1 are transmitted to the slave camera 1' (S226). Then, the master camera 1 is set to be a normal mode state (S227).

If the "presentation mode" is not selected (N in S225), it is judged whether or not the "slave mode release" is selected in S228. If the "slave mode release" is selected (Y in S228), the slave release command is transmitted to the slave camera 1' (S229). If the "slave mode release" is not selected (N in S228), the routine returns to S216.

Figure 18:
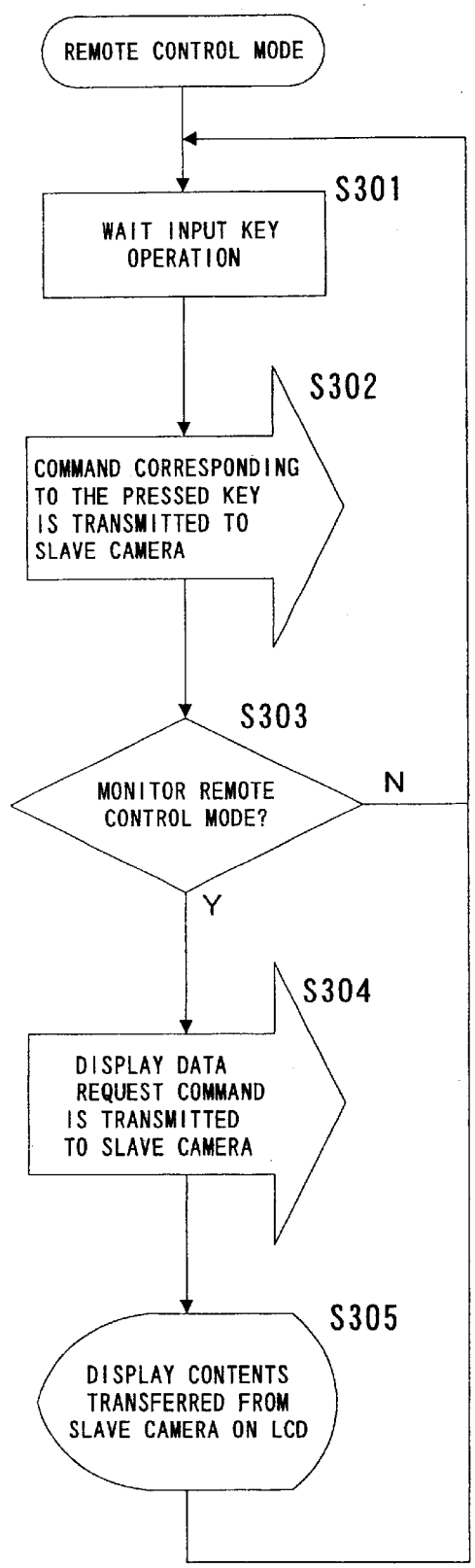
FIG. 18 is a flow chart showing a process of a remote control mode shown in FIG. 17.

Next, the process in the remote control mode will be explained with reference to the flow chart shown in FIG. 18.

First, in S301, an operation of the input key such as an UP/DOWN switch is waited. If the input key is operated, the command corresponding to the pressed key is transmitted to the slave camera 1' in S302.

In S303, it is judged whether or not it is in the "monitor remote control mode". If it is in the "monitor remote control mode" (Y in S303), the display data request command is transmitted to the slave camera 1' in S304. In S305, the transferred contents from the slave camera 1' is displayed on the LCD display 10. If it is not the "monitor remote control mode" (N in S303), the routine returns to S301.

Figure 19:
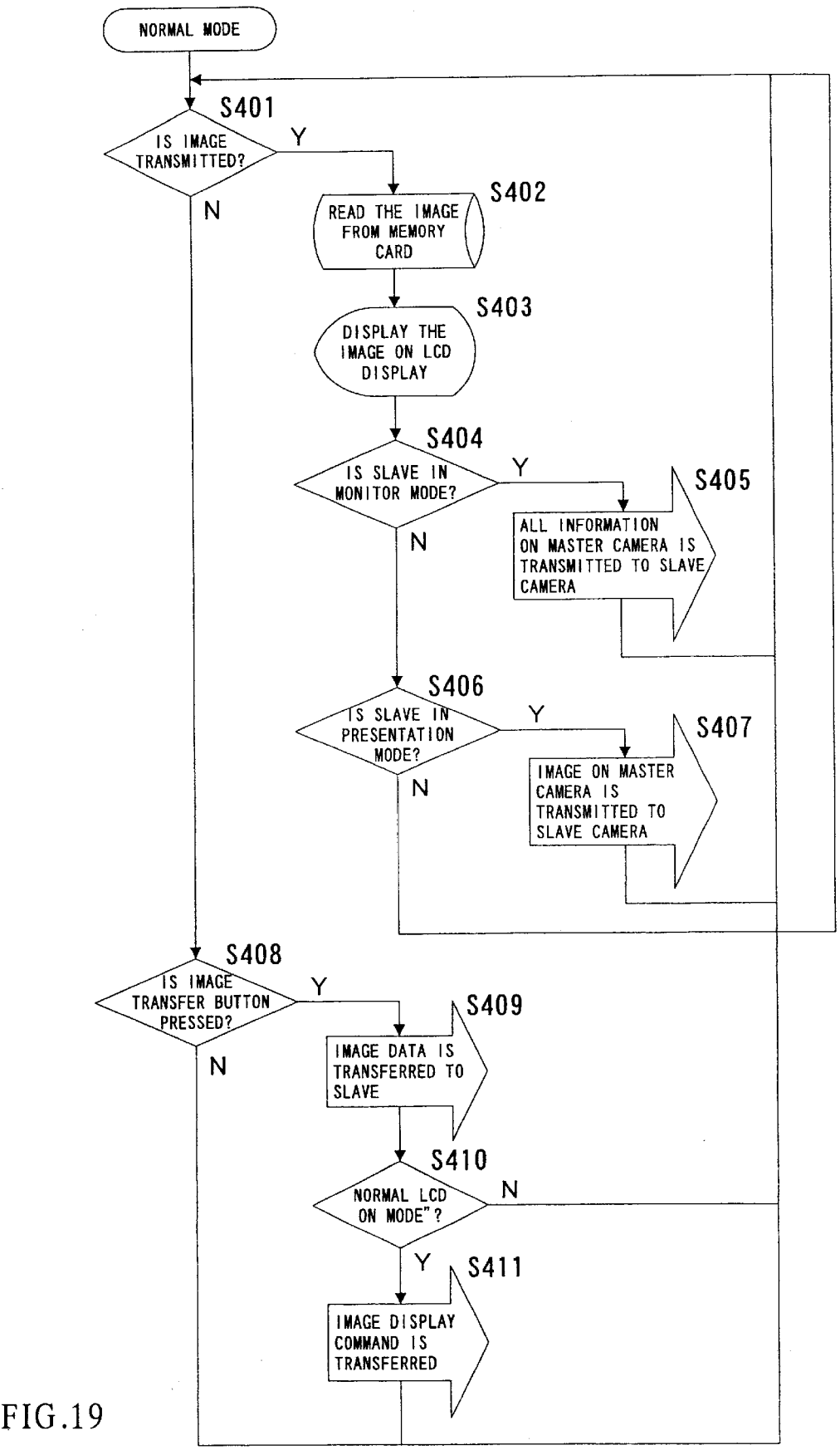
FIG. 19 is a flow chart showing a process of a master normal mode shown in FIG. 17.

Next, the process in the normal mode will be explained with reference to the flow chart shown in FIG. 19.

In S401, it is judged whether or not the image is transmitted. If the image is transmitted (Y in S401), the next image is read out from the memory card in S402, and the image is displayed on the LCD display 10 in S403.

In S404, it is judged whether or not the slave camera 1' is in the "monitor mode" in S404. If it is in the "monitor mode" (Y in S404), all of the information on the master camera is transmitted to the slave camera 1' in S405, and the routine returns to S401.

If the slave camera 1' is not in the "monitor mode" (N in S404), it is judged whether or not the slave camera 1' is in the "presentation mode" in S406. If it is in the "presentation mode" (Y in S406), the image on the master camera 1 is transmitted to the slave camera 1' in S407. Then, the routine returns to S401. Even if the slave camera 1' is not in the "presentation mode" (N in S406), the routine returns to S401.

In S401, if the image is not transmitted (N in S401), it is judged whether or not the image transfer button is depressed in S408. If the image transfer button is depressed (Y in S408), the image data is transferred to the slave camera 1' in S409. In S410, it is judged whether or not it is in the "normal LCD ON mode." If it is in the "normal LCD ON mode" (Y in S410), the image display command is transmitted in S411. If it is not in the "normal LCD ON mode" (N in S410), the routine returns to S410. If the image transfer button is not depressed (N in S408), the routine also returns to S401.

Next, a second embodiment of the present invention will be explained as follows.

Figure 20:
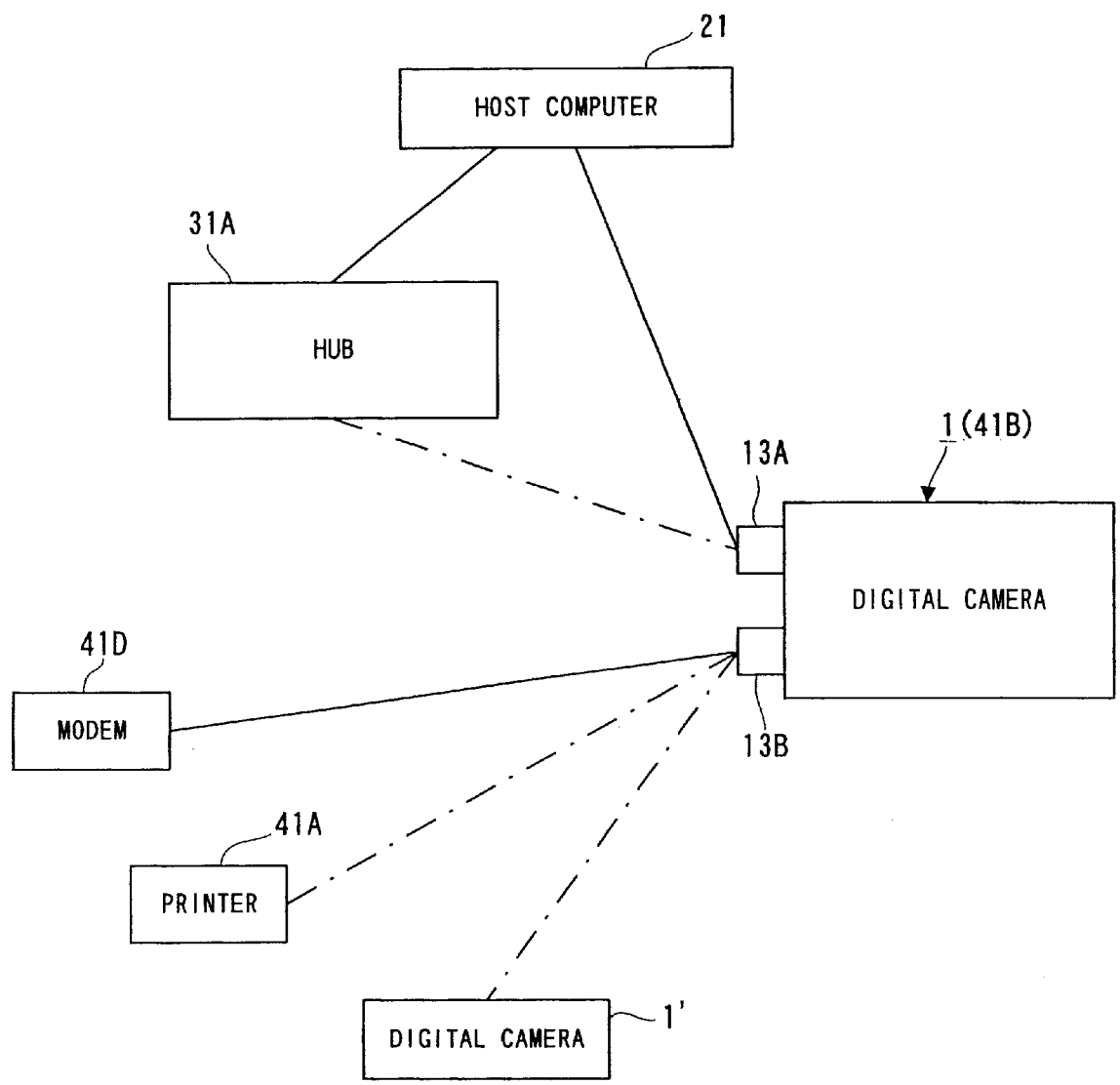
FIG. 20 illustrates a block diagram showing one example in which a digital camera and a host computer are connected each other.

In this embodiment, the digital camera 1 is connected to a host computer 21. As shown in FIG. 20, the upstream connector 13A is connected to the USB terminal of the host computer 21 or to the downstream connector of the hub 31A.

Various kinds of USB standard peripheral apparatus such as a modem 41D, the printer 41A or another digital camera can be connected to the downstream connector 13B of the digital camera 1. In this case, the host computer recognizes this digital camera 1 as a peripheral equipment 41B with a hub.

As mentioned above, in cases where digital cameras 1 and 1' are connected each other, or a printer or a modem is directly connected to the digital camera 1, no apparatus is connected to the connector 13A, and another digital camera 1', the printer 41A or the modem 41D is connected to the connector 13B. In this case, the digital camera 1 functions the same as the host computer 21 and controls the peripheral equipments such as another digital camera 1', the printer 41A, and/or the modem 41D connected to the connector 13B.

Figure 21:
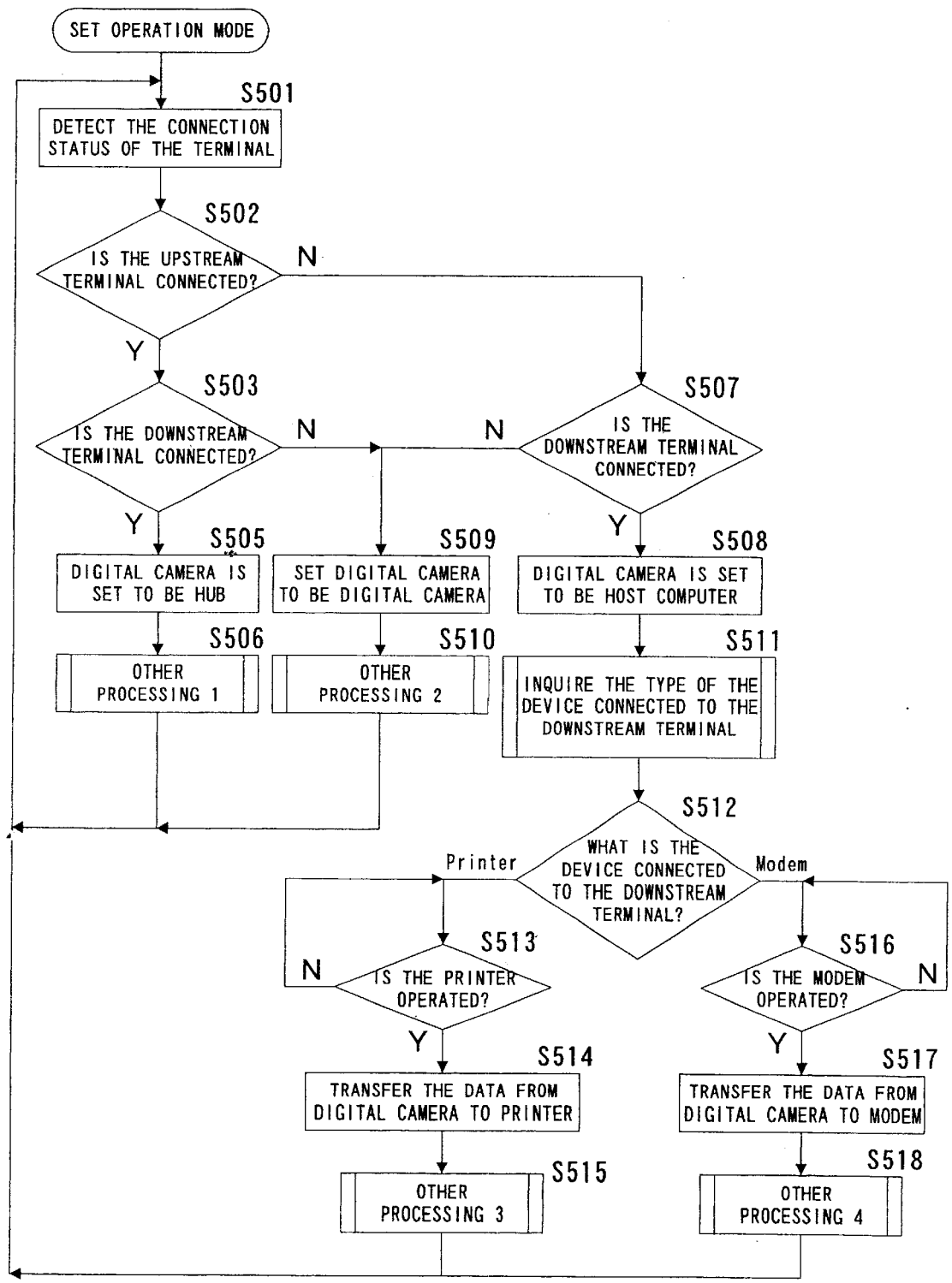
FIG. 21 illustrates a flow chart showing an operation mode set process of the digital camera when another device is connected to the digital camera.

Next, the operation mode set steps in the second embodiment will be explained with reference to the flow chart shown in FIG. 21.

First, in S501, the connection status of the terminal 13 of the digital camera 1 is detected. And it is judged whether or not the upstream terminal 13A is connected in S502. If the upstream terminal 13A is connected by a device (Y in S502), it is judged whether or not the downstream terminal 13B is connected.

If the downstream terminal 13B is connected by a device (Y in S503), since the upstream connector and the downstream connector are connected by devices, the digital camera 1 sets itself as a hub in S505. In S506, other processing 1 as a hub is performed. In this embodiment, the data transferred from the upstream side is transferred to the downstream side, and vice versa. Thereafter, the routine returns to S501.

On the other hand, in S502, if the upstream terminal 13A is not connected by a device (N in S502), it is detected if the downstream terminal 13B is connected in S507.

If the downstream terminal 13B is connected by a device (Y in S507), since only the downstream terminal 13B is connected by the device, the digital camera sets itself as a host computer for the downstream devices in S508, and then inquires the type of the device connected to the downstream terminal.

In S512, if it is judged that the type of the device connected to the downstream terminal 13B is a printer, after detecting the operation in S513, the data is transferred to the printer 41A from the digital camera 1 in S514. Then, in S515, other processing 3 required when the printer is connected is performed. In S512, if it is judged that the type of the device connected to the downstream terminal 13B is a modem 41D, after detecting the operation in S516, the data is transferred to the modem 41D from the digital camera 1 in S517. Then, in S518, other processing 4 required when the modem is connected is performed. Thereafter, the routine returns to S501.

In cases where the upstream terminal 13A is connected by a device (Y in S502) or is not connected by any device (N in 502), if the downstream terminal 13B is not connected by a device (N in S503, and N in S507), the digital camera 1 sets itself as a digital camera in S509. Then, in S510, other processing 2 (known processing of a digital camera). Thereafter, the routine returns to S501.

In a case where the digital cameras are connected each other and the display controls are performed in accordance with their operations, these digital cameras may be connected via an IEEE 1394 interface.

As mentioned above, according to the embodiment, in a case where a digital camera is connected by another digital camera, the operation thereof can easily be performed by a single digital camera, and one of the digital cameras can control the other digital camera, resulting in an easy operation.

Furthermore, in a case where the upstream and downstream connectors for connecting external apparatuses by an interface based on the USB standard, and the downstream connector is to be connected by another digital camera, it becomes possible to control another digital camera by using an interface based on the USB standard.

According to the digital camera characterized in that an upstream and downstream connectors for connecting external apparatuses at an interface based on the USB standard, and the digital camera functions as a host computer of an apparatus such as a digital camera, a modem, or a printer to be connected to the downstream connector when the upstream connector is not connected by a device, a direct control not only between digital cameras but also between a digital camera and a modem, or a printer, by utilizing a USB interface which could only be used for connecting the digital camera to the host computer.

According to the digital camera characterized in that an upstream and downstream connectors for connecting external apparatuses by an interface based on the USB standard, and the digital camera operates as a hub of a device connected to the downstream connector when the upstream connector is connected by a computer or a hub, a normal tree-structure in which a USB interface is used can be obtained. Thus, an apparatus connected to the downstream connector can be controlled by the computer.

The terms and descriptions in this specification are used only for explanatory purposes and the present invention is not limited to these terms and descriptions. It should be appreciated that there are many modifications and substitutions without departing from the spirit and the scope of the present invention which is defined by the appended claims.

What is claimed is:

1. A digital camera, comprising:
   a connector for connecting said digital camera to another digital camera;
   an interface for exchanging data between said digital camera and said another digital camera; and
   a controller for controlling said another digital camera via said interface when said another digital camera is connected to said connector,
   wherein said controller controls a display provided to said another digital camera so as to turn on/off the display when the data exchange between said digital camera and said another digital camera is executed.

2. The digital camera according to claim 1, further comprising a display for displaying a controlling menu for said another digital camera.

3. The digital camera according to claim 2, wherein said digital camera displays a controlled result of said another digital camera on said display at a first display mode and does not display a controlled result of said another digital camera on said display at a second display mode.

4. The digital camera according to claim 1, wherein said digital camera transfers a photographed image data and its related data to said another digital camera at a first transfer mode, and transfers only the photographed image data at a second transfer mode.

5. The digital camera according to claim 1, wherein said interface is an interface based on a USB (Universal Serial Bus) standard.

6. The digital camera according to claim 5, wherein said digital camera is equipped with an upstream connector and a downstream connector for connecting an external equipment via said interface, and wherein said another digital camera is connected to said downstream connector.

7. The digital camera according to claim 1, wherein said digital camera has a function for selecting a first control mode in which said digital camera controls said another digital camera or a second control mode in which said digital camera is controlled by said another digital camera.

8. A digital camera, comprising:
   an interface based on a USB (Universal Serial Bus) standard;
   first and second connectors for connecting a plurality of external equipment via said interface;
   a detector for detecting whether or not any of the plurality of external equipment is connected to said first and second connectors; and
   a controller for changing an operation of the digital camera based on the detected results of the detector, wherein
   when the detector detects that external equipment is connected to both said first and second connectors, the controller sets the digital camera to operate as a hub of the external equipment connected to both said first and second connectors, and
   when the detector detects that external equipment is connected to the second connector and not to the first connector, the controller sets the digital camera to operate as a master controller of the external equipment connected to the second connector.

9. The digital camera according to claim 8, wherein said first and second connectors are upstream and downstream connectors, respectively of said digital camera.

10. The digital camera according to claim 9, wherein the external equipment to be connected to said downstream connector is anyone of a digital camera, a modem and a printer.

11. The digital camera according to claim 9, wherein the external equipment to be connected to said upstream connector is a computer or a hub.

12. A digital camera, comprising:
   a connector for connecting said digital camera to another digital camera, said another digital camera having a power supply configure to supply power to said another digital camera;
   an interface for exchanging data between said digital camera and said another digital camera; and
   a controller for controlling said another digital camera via said interface when said another digital camera is connected to said connector,
   wherein said controller controls said another digital camera so as to turn on/off a display of said another digital camera and power continues to be supplied to said another digital camera from said power supply when the display is turned off by said controller.

13. The digital camera according to claim 12, further comprising a display for displaying a controlling menu for said another digital camera.

14. The digital camera according to claim 13, wherein said digital camera displays a controlled result of said another digital camera on said display at a first display mode and does not display a controlled result of said another digital camera on said display at a second display mode.

15. The digital camera according to claim 12, wherein said digital camera transfers a photographed image data and its related data to said another digital camera at a first transfer mode, and transfers only the photographed image data at a second transfer mode.

16. The digital camera according to claim 12, wherein said interface is an interface based on a USB (Universal Serial Bus) standard.

17. The digital camera according to claim 16, wherein said digital camera is equipped with an upstream connector and a downstream connector for connecting an external equipment via said interface, and wherein said another digital camera is connected to said downstream connector.

* * * * *